United States Patent [19]
Nilsson et al.

[11] Patent Number: 6,050,253
[45] Date of Patent: Apr. 18, 2000

[54] HAND-OPERATED CUTTING MACHINE

[75] Inventors: Dan Nilsson, Sjuntorp; Ove Donnerdal, Sävedalen; Håkan Larsson, Mölndal, all of Sweden

[73] Assignee: Aktiebolaget Electrolux (publ), Stockholm, Sweden

[21] Appl. No.: 09/102,282

[22] Filed: Jun. 22, 1998

[30] Foreign Application Priority Data

Jun. 25, 1997 [SE] Sweden ................................. 9702437

[51] Int. Cl.$^7$ ...................................................... B28D 1/04
[52] U.S. Cl. .......................................... 125/13.01; 125/15
[58] Field of Search .................................... 125/13.01, 15

[56] References Cited

U.S. PATENT DOCUMENTS

| | | | |
|---|---|---|---|
| 4,848,001 | 7/1989 | Clark et al. | 30/391 |
| 5,038,474 | 8/1991 | Larsson et al. | 30/123.3 |
| 5,381,723 | 1/1995 | Nilsson et al. | |
| 5,588,418 | 12/1996 | Holmes et al. | 125/13.01 |
| 5,634,372 | 6/1997 | Tangen | 30/390 |
| 5,687,483 | 11/1997 | Neubert et al. | 30/312 |

FOREIGN PATENT DOCUMENTS 0 347 869  12/1989  European Pat. Off. .

*Primary Examiner*—David A. Scherbel
*Assistant Examiner*—Shantese McDonald
*Attorney, Agent, or Firm*—Crowell & Moring LLP; Michael D. Bednarek

[57] ABSTRACT

A hand-operated cutting machine comprising a rotatable saw blade (3), a machine body with drive machinery for rotation of the saw blade, a rear manoeuvring handle (20) with control (17, 18) for a drive motor (2) included in said drive machinery and a front handle bow (25) which has the form of a crow which stretches from one side of the machine body over the machine body or over the saw blade to the other side of the machine body. The handle bow is rotatably attached to the machine body in a hinge (26) with an axis of rotation (24) which is located behind the saw blade and is perpendicular to the plane of the saw blade, that both ends of the handle bow are connected to each other through said hinge, and that the handle bow is fixingly adjustable in different rotational positions.

14 Claims, 6 Drawing Sheets

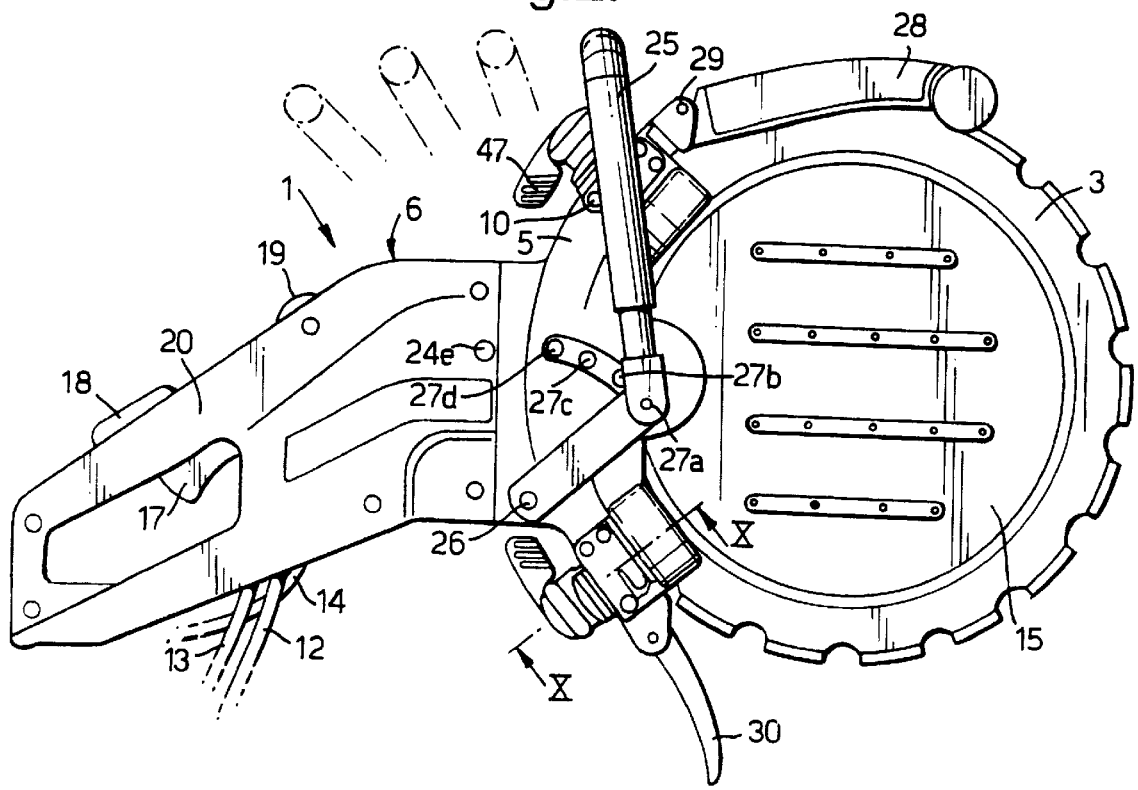
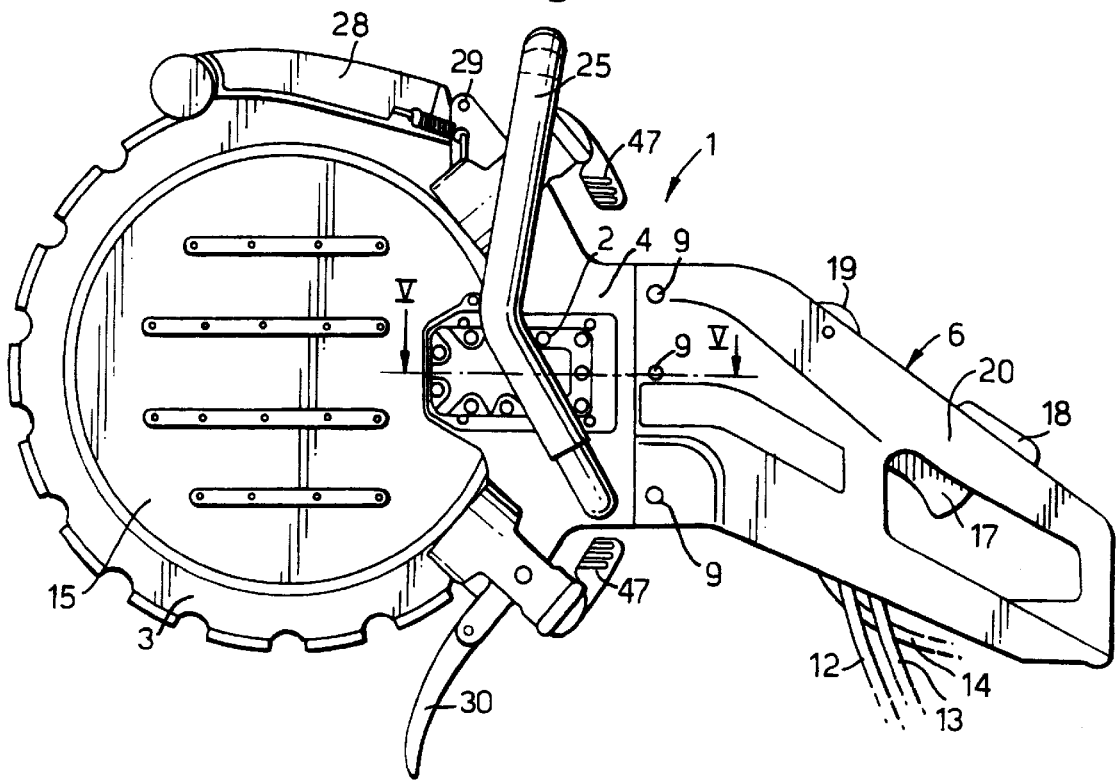

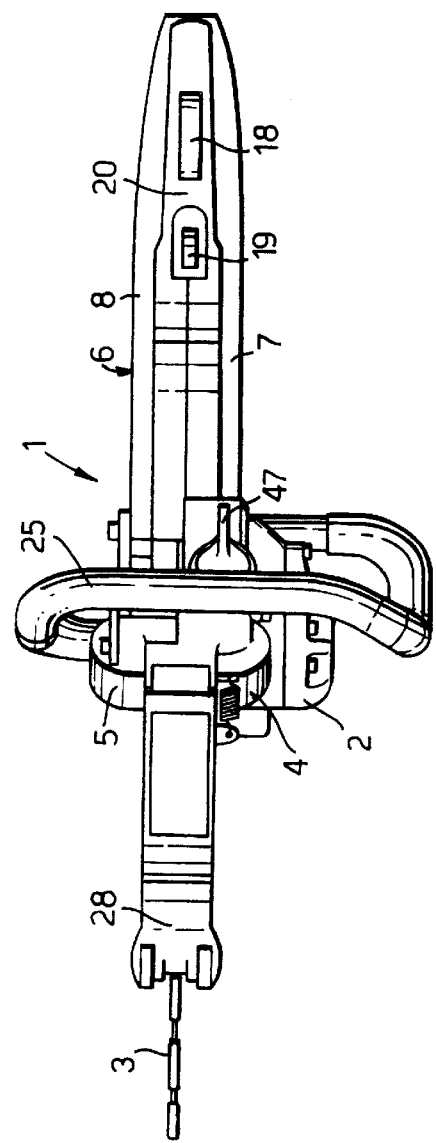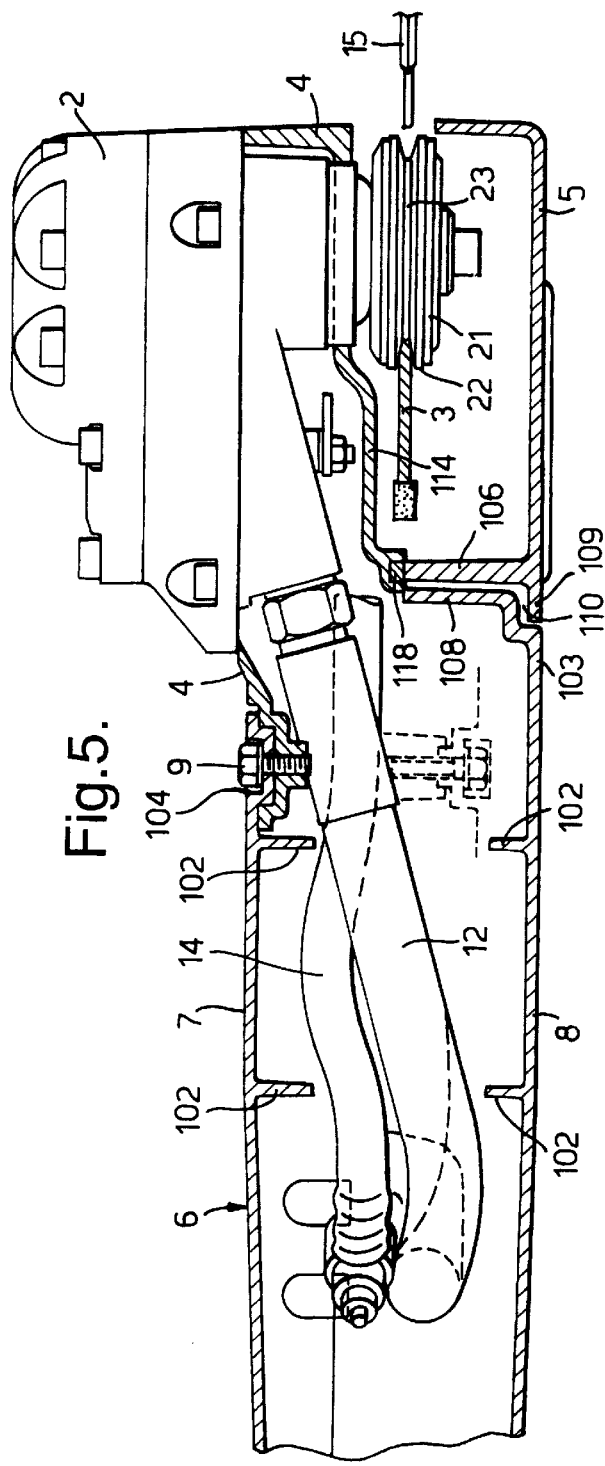

HAND-OPERATED CUTTING MACHINE

The invention relates to a hand-operated cutting machine comprising a rotatable saw blade, a machine body with drive machinery for rotation of the saw blade, a rear manoeuvring handle with control for a drive motor included in said drive machinery and a front handle bow. In the concept of cutting machines and saw blades, also saws and cutter wheels are included. The invention can be applied in both cutting machines with conventional rotatable cutting blades and in cutting machines with annular saw blade with off-centre drive of the blade, but has been developed especially in order to further improve the latter type of cutting machines with annular saw blade.

BACKGROUND OF THE INVENTION

Hand-operated cutting machines with annular saw blade have great advantages over cutting machines with saw blade with traditional centre drive. The predominant advantage is that they provide an extremely large cutting depth in relation to the diameter of the blade. They, however, also have other advantages, among other a great ergonomic advantage; they are relatively light-weighted. Yet, there exists a need to improve them in ergonomic aspect. Above all, it is for this machine type, as for other cutting machines of the above kind, desirable that the operator should be able to hold and to manoeuvre the machine in a, from an ergonomic viewpoint best mode which may vary from person to person, and also in consideration of the demands that are raised in different operating situations. It is from an ergonomic viewpoint also desirable to be able to reduce the total weight of the machine still further and to distribute the mass to make the machine well balanced.

BRIEF DESCRIPTION OF THE INVENTION

The object of the invention is to address the above problem complex. This is, according to a first aspect of the invention, achieved by the handle bow being rotatably attached to the machine body about an axis of rotation which is perpendicular to the plane of the saw blade and that the handle bow is adjustable in different rotation positions.

According to a second aspect of the invention, which relates to the reduction of the total weight of the cutting machine and the distribution of the total mass in order to improve the balance of the machine, and which can be applied in cutting machines with annular saw blade, the invention is characterised in that the drive motor, a drive wheel which is connected to the motor and a pair of rollers adapted to contact and to roll against the web of the saw blade on one side of the blade, as well as bearings for these rollers, are arranged on or in a chassis of metal, a main part thereof partially covering the blade on its one side, that two second rollers, here called support rollers, are arranged and journalled in bearings in a support roller cover, which partially surrounds the blade on its other side, that a manoeuvring arm, which exhibits a rear handle and motor control, mainly consists of plastics, that the chassis of metal is joined with the manoeuvring arm of mainly plastics by screw joint, that the support roller cover is joined with the chassis by screw joint, and that the front handle with both of its ends is joined with the chassis.

Additional characteristics and aspects of the invention appear from the claims and from the following detailed description of a preferred embodiment.

BRIEF DESCRIPTION OF THE DRAWINGS

In the following detailed description, reference is made to the enclosed drawings, of which FIG. 2 is a side view from the left, showing a first side of the cutting machine and its annular saw blade, FIG. 3 is a side view from the right, showing the other side of the cutting machine and the saw blade, FIG. 4 shows the cutting machine from above, FIG. 5 is a view V—V in FIG. 3.

DETAILED DESCRIPTION OF AN EMBODIMENT

Figure 1:
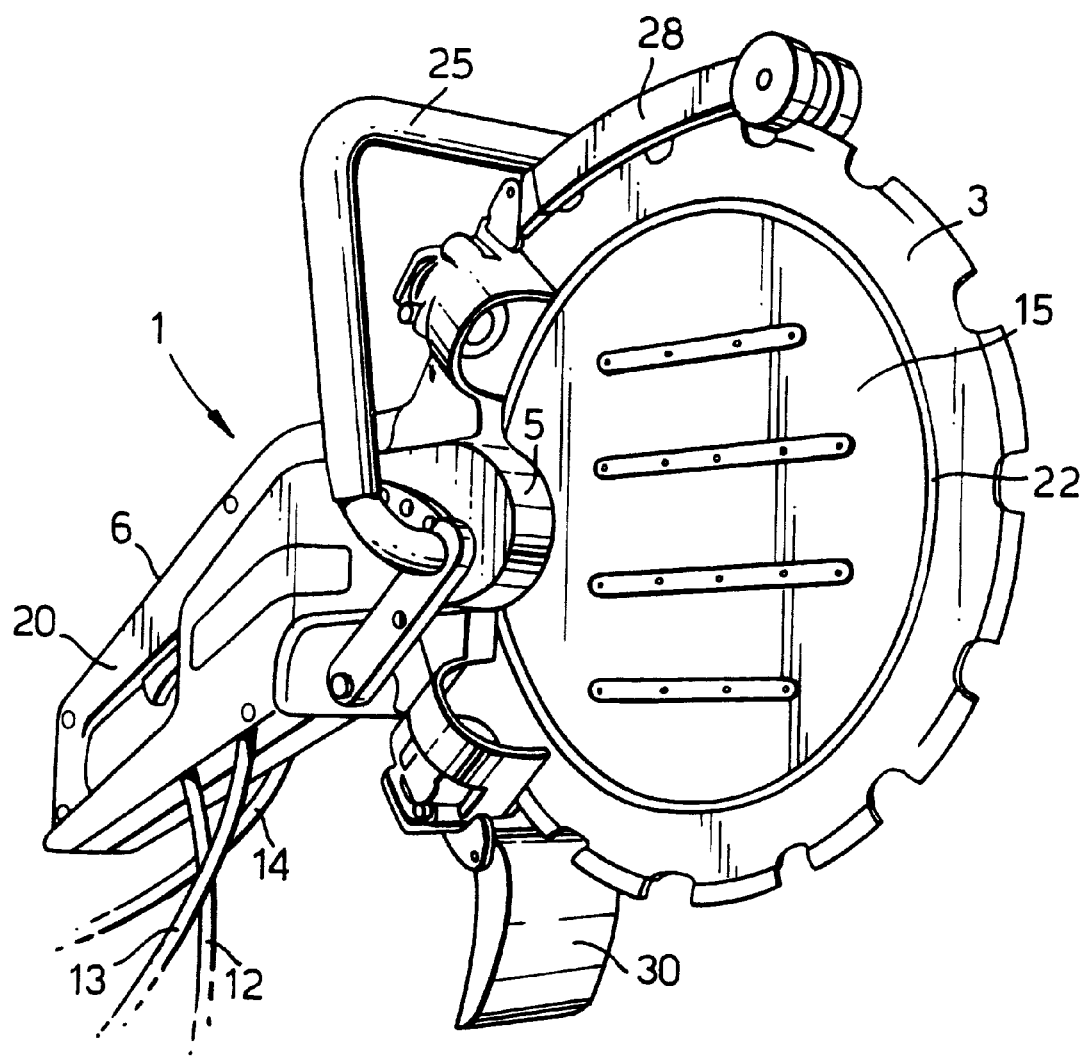
FIG. 1 is a perspective view of a cutting machine, in connection with which the device according to the invention can be applied.
Figure 6:
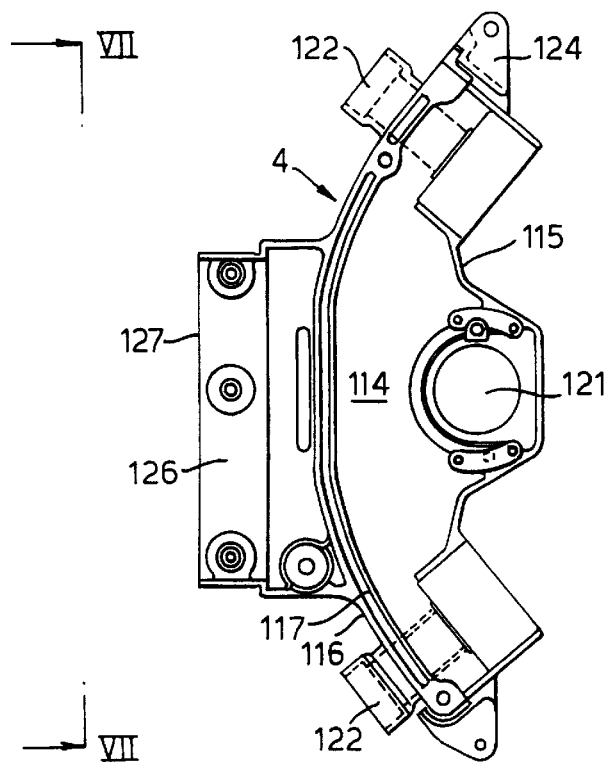
FIG. 6 shows a chassis, which is part of the cutting machine, in a view from the plane of the saw blade.
Figure 7:
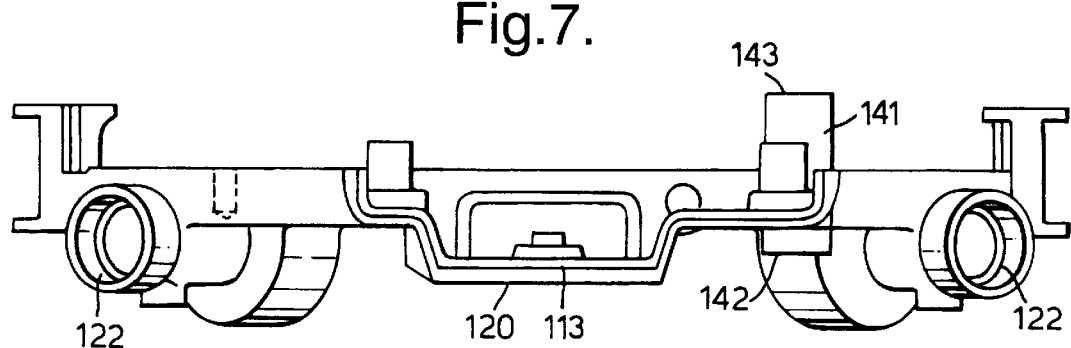
FIG. 7 is a view VII—VII in FIG. 6.
Figure 8:
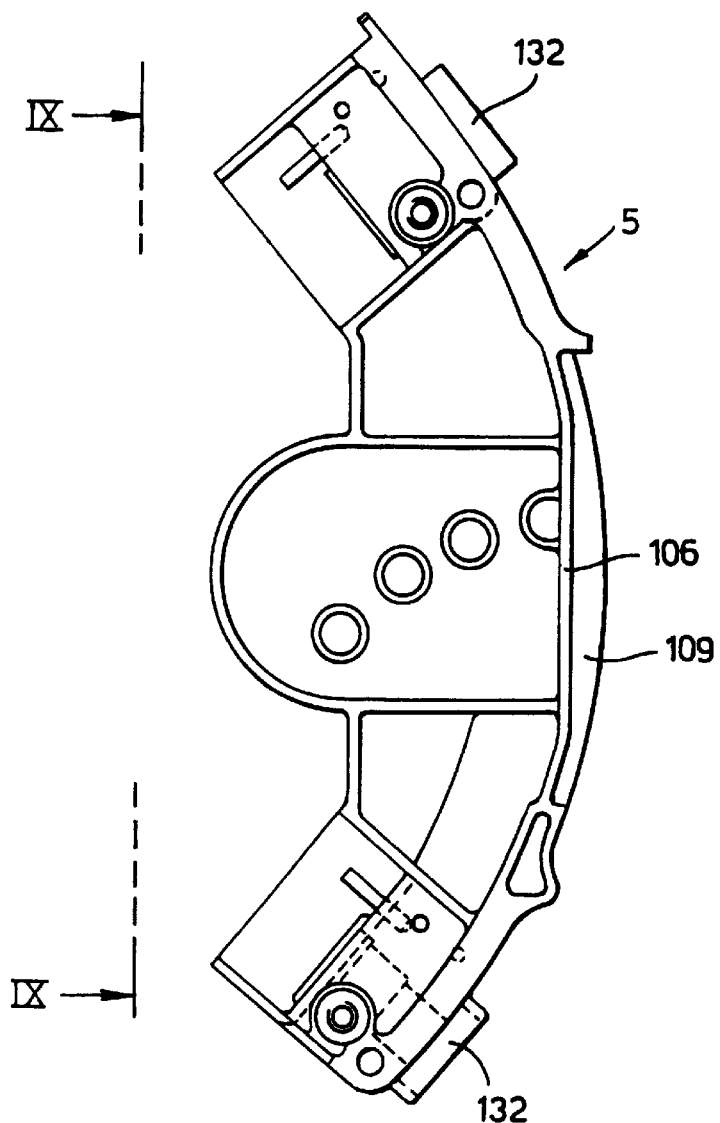
FIG. 8 shows a support roller cover, which is part of the cutting machine, in a view from the plane of the saw blade.
Figure 9:
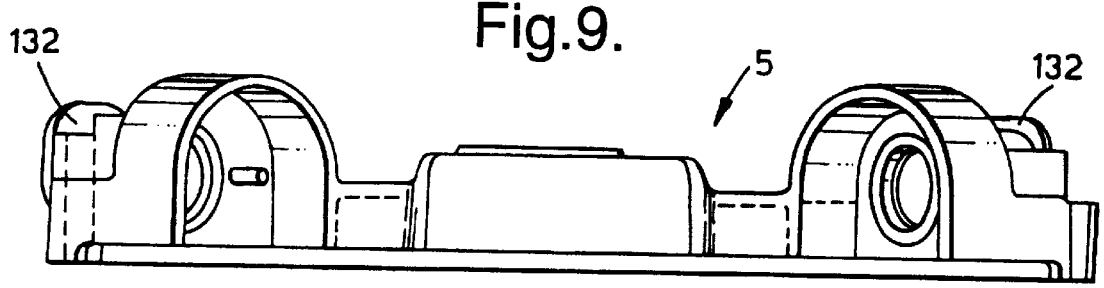
FIG. 9 is a view IX—IX in FIG. 8.

With reference first to FIGS. 1–9, a hydraulically driven cutting machine is denoted 1 and an annular saw blade, driven by a hydraulic motor 2, is denoted 3. The main parts of the cutting machine 1 are a chassis 4 of cast light metal (aluminium alloy of the type Alumin), a support roller cover 5 of the same material and a rear manoeuvring and handle part 6, in the following called a manoeuvring arm. The manoeuvring arm 6 is manufactured from reinforced plastics and does in its turn consist of a left and a right moiety 7 and 8, respectively, FIG. 5, which are joined by screws to form a unit. The chassis 4 is joined with the manoeuvring arm 6 with screws 9 and the support roller cover 5 is joined with the chassis 4 with a pair of screws 10, FIG. 2.

The hydraulic motor 2 is mounted on the chassis 4 and is of the type described in U.S. Pat. No. 5,381,723. A pair of conduits for hydraulic oil has been denoted 12, 13 and a conduit for cooling water has been denoted 14. The cooling water is led to the saw blade 2 via a water distribution disc 15, which may be of a known design, for example according to U.S. Pat. No. 5,038,474. In the manoeuvring arm 6 there is a control 17 for the hydraulic oil, a starter lock 18 and a control 19 for cooling water, everything in connection with a rear handle 20, together with not shown mechanisms and valves.

Between the chassis 4 and the support roller cover 5, there is a drive wheel 21, which is rotated by the hydraulic motor 2. The inner edge 22 of the saw blade 3 is wedge-shaped and is brought into a wedge-shaped groove 23 in the drive wheel in a manner known per se.

A handle bow (frame) 25, which forms the front handle of the machine, is rotatably connected to the chassis 4 in a rotational hinge 26. The handle bow 25 is adjustable in four fixed operating positions, which are determined by four cylindrical depressions 27a–27d in the support roller cover 5, which depressions can receive a resilient plunger on the handle bow 25. A cover for the blade has been denoted 28. This can be turned upwards-rearwards in a hinge 29 from the position which is shown in FIGS. 2–4, to a rear position when the handle bow 25 has been brought to its rearmost operating position, when said plunger bears in the rear hole 27d. In addition, there is a circular depression 27e in the manoeuvring arm 6. This depression 27e can also contain said plunger in order to fix the handle bow when it has been brought even further rearwards in order to be able to demount the support roller cover 5, e.g. to change the blade. A guard has been denoted 30.

The device to hold and guide the saw blade 2 comprises—besides said drive wheel 21—in a manner known per se, a pair of not shown guide rollers in the chassis 4 and a pair of not shown support rollers in the support roller cover 5. In addition to this, there are bearings for guide rollers and support rollers in the chassis and in the support roller cover, components on and in the chassis to clamp the blade in a radial direction and components on and in the support roller cover to clamp the blade in an axial direction. All of these parts, as well as drive motor, transmissions etc. are made of metal and therefor represent a substantial part of the total weight of the machine. In addition to this there are the weights of the chassis and the support roller cover themselves. These can certainly be somewhat reduced by a suitable design and by choice of suitable light metal alloy, but they have to be made robust considering the large stress that they are exposed to and therefor they need to represent a considerable amount of the total mass of the machine.

The manoeuvring arm 6 is manufactured of fibre reinforced plastics, suitably of glass fibre reinforced polyamide plastics, mainly for three reasons. Fibre reinforced plastics, such as glass fibre reinforced polyamide plastics, is an excellent material of construction for the manoeuvring arm, which well complies with the demands required by the functions of the manoeuvring arm. It has further a lightweight in comparison with metallic construction materials, even compared with light metal, whereby the total weight of the machine can be reduced. The third reason is that the relatively light manoeuvring arm contributes to balance the weight/mass of the machine in a desired direction, so that the point of balance is displaced forwards, which is beneficial from an ergonomic point of view.

From a design point of view, the manoeuvring arm 6 consists of two halves, a left half 8 and a right half or moiety 7, which are united to each other in a vertical plane of division with screws 9. On the inside there are stiffening fins 102. The rear end is designed with a rear handle 20 with the controls 17, 19 and the lock 18 easy to reach. In a manner known per se, the entire back part of the manoeuvring arm 6 is inclined downwards. The right half 7 is somewhat longer than the left one and extends, with a part 103, beyond the front edge 104 of the left half, which is completely straight, as is the end of the right half which is designed with an inwards facing end wall 108, adapted to the form of, in the area of the manoeuvring arm 6, the straight outside 106 of the support roller cover 5, against which it bears. In order to further strengthen the connection of the manoeuvring arm with the integrated body which is defined by the chassis 4 and the support roller cover 5, the support roller cover has, in the area of the manoeuvring arm 6, a backwards extending tongue 109, which extends into a recess 110 in the edge between the front end wall 108 and the outside of the right half 7 of the manoeuvring arm 6.

The chassis 4 has a main part 115 comprising a plate 114 which together with the support roller cover 5 forms a hood for the drive wheel 21 and for a portion of the saw blade 3 and which has a central projecting portion 113 for the hydraulic motor 2. The inner edge 116 of the main part 115 follows the arched contour of the outer wall 106 of the support roller cover. In the edge 116 there is a groove 117, which holds a packing 118, FIG. 5. The main part 115 of the chassis also contains or is provided with means for the drive of the saw blade. The hydraulic motor 2 is thus mounted on a plane-ground surface 120 with a through hole 121. Further, there is a bearing housing 122 for guide rollers for the saw blade and for clamping components, including a knob 47 for radial clamping of the annular blade 3. The blade cover 28 is attached via the hinge 29 to a nose shaped projection 124 on the chassis 4.

From the main part 114 of the chassis 4, there is an attachment part 126 extending straight backwards below the left half 8 on the manoeuvring arm 6. The attachment part 126 ends with a straight edge 127, which abuts a fin 102 on the inside of the manoeuvring arm. The manoeuvring arm 6 and the chassis 4 are united to each other by three screws 9 via the attachment part 126.

The design of the support roller cover has in all essentials been described above. It should also be mentioned though that it also has a pair of bearing housings 132 for a pair of support rollers, which together with the drive wheel 21 and the guide rollers which are journalled in bearings in the chassis, hold the saw blade 3 in the axial direction. The support roller cover 5 is attached to the chassis 4 by a pair of screws 10. The rear, straight wall part 106 of the support roller cover abuts, when the machine is mounted, the packing 118 in the groove 117 in the rear edge on the plate 114 of the chassis. Further, the tongue 109 rests in the recess 110 on the manoeuvring arm, FIG. 5, and cooperates in making a strong joint between the manoeuvring arm 6, on the one side, and the unit which consists of the chassis 4 and the support roller cover 5 and the members which are mounted on or in that unit, on the other side.

Figure 10:
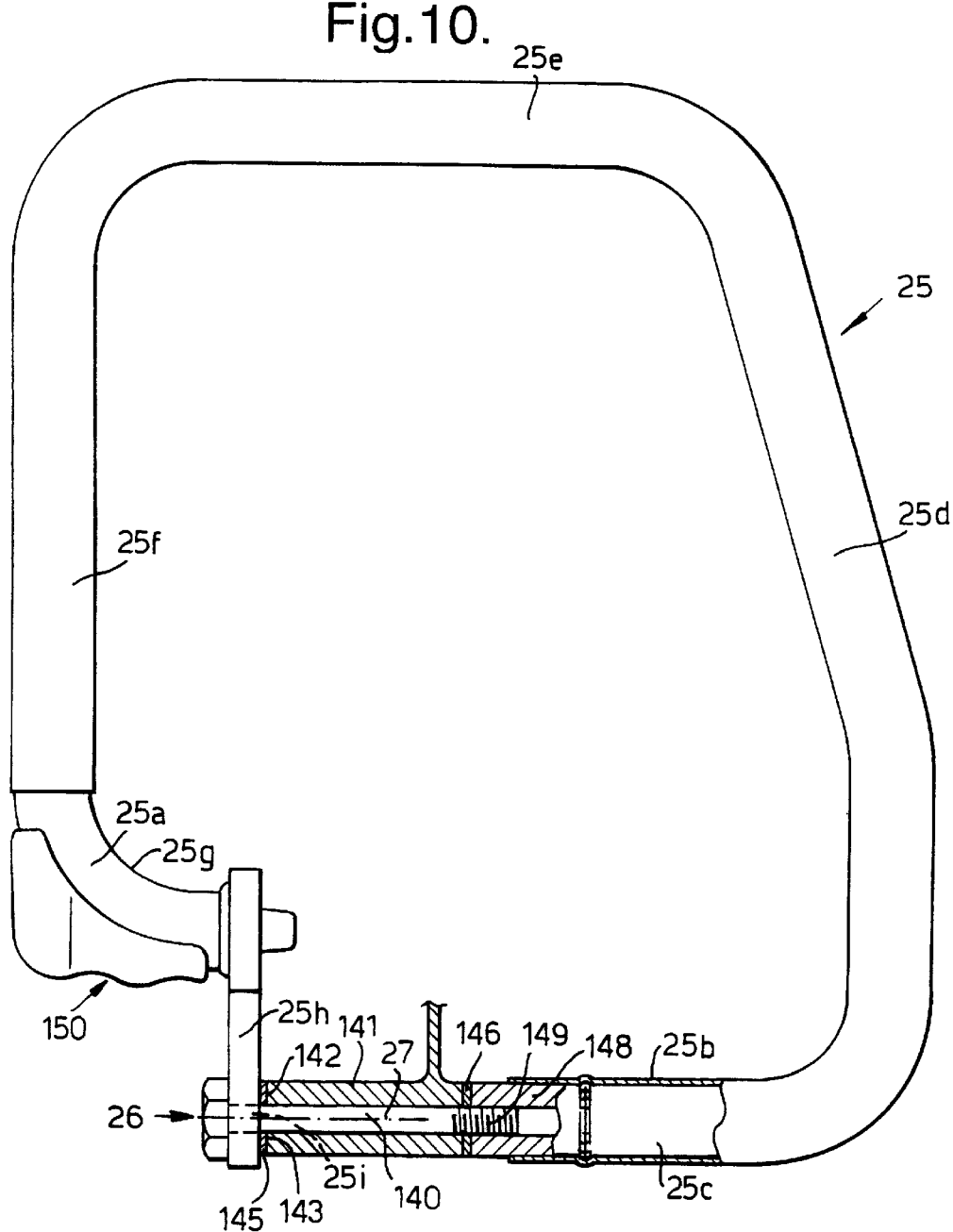
FIG. 10 shows how a handle bow is rotatably attached to the chassis.

The shape of the handle bow 25 in a front view is shown in FIG. 10, which also shows how the handle bow is rotatably attached to the chassis 4. It consists of a bent tube 25a, which is covered with plastics 25b. It has, on the left side, first a straight portion 25c, which extends straight out from the chassis 4, perpendicularly to the plane of the saw blade 3. It is thereafter angled backwards with a straight portion 25d on the left side of the machine, a portion 25e above the machine, a portion 25f on the right side of the machine and finally a bent portion 25g which with its end is welded to a flat portion 25h, which is parallel with the saw blade 3. In the end of the flat portion, there is a through hole 25i for a journal. In connection with the bent portion 25g in the flat portion 25h, there is also a mechanism 150 to lock the handle bow in different rotational positions. A metal insert 148 is welded in the straight end portion 25c. In this insert there is a threaded hole 149. The holes 25i and 149 are coaxial; with the axis of rotation 24.

The journalling of the handle bow in the chassis 4 is designed as a hinge 26 with a journal 140, FIG. 10, which is rotatable about the axis of rotation 24, which is perpendicular to the plane of the saw blade 3. The journal 140 consists of a screw which extends through a bearing sleeve 141, which is an integrated part of the casted chassis body, FIG. 7. The bearing sleeve 141 has a left end surface 142 and a right end surface 143. The plane of the latter is outside the outside of the right half 7 of the manoeuvring arm, FIG. 4. The flat portion 25h of the handle bow 25 abuts the right end surface 143 of the bearing sleeve 141, optionally via a friction decreasing washer 145. The handle bow with its end insert 148 abuts, on the right side of the machine, against the right end surface 143 of the bearing sleeve 141, optionally via a between friction decreasing washer 146. The journal 140 consists of a screw with a head in one side on the outside of the left, flat portion 25h of the handle bow 25, and with threads in the other end cooperating with the threads in the hole 149 in the insert 148.

Figure 11:
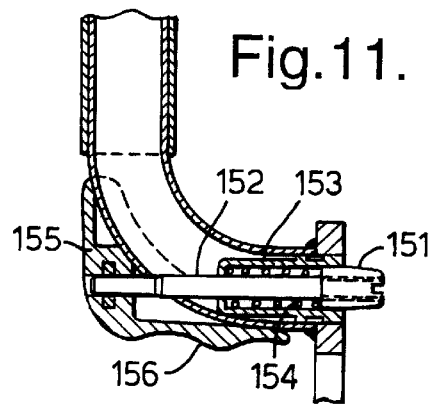
FIG. 11 illustrates means to detachably fix the handle bow in different rotation positions.

The mechanism to detachably fix the handle bow 25 in different rotational positions is shown in cross-section in FIG. 11. It consists of a plunger 151 on a plunger rod 152, which is movable in a sleeve 153, which is attached in the flat portion 25*h* of the handle bow and extends into the bent portion 25*g* of the handle bow. A spring 154 is arranged in the sleeve and presses the plunger 151 in an outward direction (to the right in FIG. 11). The plunger rod 152 is screwed with its rear end into a handle 155, which has a finger grip 156 in order to facilitate manoeuvring. By pulling the handle 155 backwards, the plunger 151 is pulled in during compression of the pressure spring 154, whereafter the handle bow can be turned to a new position. The handle 155 is then released, whereby the plunger 151 by means of the spring 154 enters a new one of the recesses 27*a*–27*d* on the support roller cover 5.

The handle bow 25 is normally fixed in the front operating position, FIG. 2. In this position there is achieved good balance and opportunity for the operator to lay the force, via the handle bow, near the working point of the blade. The rearmost operating position, when the plunger is introduced in the rear recess 27*d* on the support roller cover 5, is used e.g. for operation on a ceiling. When the handle bow, in that way, is brought maximally backwards by rotation in the hinge 26 about the axis 24, the cover 28 for the blade can be turned completely backwards, so that the upper part of the blade can be used for sawing. The positions therebetween—represented by the recesses 27*b* and 27*c*—can be used according to individual desires or due to the demands of circumstances.

By good distribution of the total weight/mass of the machine with the point of balance closer to the point of working than in prior art, as well as by a rotatable and in different operating positions fixable handle bow, comprising an operating position brought close to the point of working, and especially when these two situations occur at the same time, there is afforded a cutting machine with very good ergonomic operating properties.

What is claimed is:

1. Hand-operated cutting machine comprising a rotatable saw blade (3), a machine body with drive machinery for rotation of the saw blade, a maneuvering arm (6) with a rear maneuvering handle (20) with control (17, 18) for a drive motor (2) included in said drive machinery and a front handle bow (25) which has the form of a bow which stretches from one side of the machine body over the machine body to the other side of the machine body, the handle bow being rotatably attached to the machine body in a hinge (26) with an axis of rotation (24) which is located to the rear of the saw blade and is perpendicular to the plane of the saw blade, both ends of the handle bow being connected to each other through said hinge, the handle bow being fixingly adjustable in different rotational positions by means of a mechanism (150) to detachably fix the handle bow in the different rotational positions, said mechanism comprising a first fixing member (151) mounted in a first end of a first portion (25*h*) of the rotatable front handle bow (25), a second end of said first portion of the front handle bow being rotatably connected to said hinge; characterized by (a) a series of second fixing members (27A–27D), defining the different rotational positions of the handle bow, are provided on a stationary part (5) of the machine, said second fixing members being distributed along an arch of a circle which has its center coinciding with the axis of rotation of the handle bow, said stationary part (5) being integrated with the machine body;

(b) a spring member (154) provided to press the first fixing member (151) towards any of said second fixing members to engagement with said any of said second fixing members when the handle bow is turned to one of said different rotational positions; and (c) a gripping handle (155) on said handle bow for retracting said first fixing member under compression of the said spring member for releasing the first fixing member from its engagement with said any of the second fixing members, allowing the handle bow to be rotated to another of the different rotational positions of the handle bow.

2. Cutting machine according to claim 1, wherein the gripping handle (155) is mounted on a second portion (25*g*) of the handle bow between said first handle bow portion (25*h*) and a third portion (25*f*) of the handle bow, which third portion extends along one side of the machine.

3. Cutting machine according to claim 2, characterized in that said first portion (25*h*) of the handle bow extends along and close to the right hand side of the machine, that said third portion (25*f*) of the handle bow also extends along the right hand side of the machine but further to the right in relation to the said first portion, and that said second portion (25*g*) on which the said gripping handle (155) is mounted extends outwards from said first end of the first bow handle portion, forming a connection between said first and third bow handle portions.

4. Cutting machine according to claim 3, characterized in that at least a part of the handle bow is located in front of the axis of rotation (24) of the handle bow, when the handle bow takes its foremost rotational position.

5. Cutting machine according to claim 1, characterized in that said hinge (26) is located adjacent to the bottom of the machine body, and that said second fixing members are located approximately midway between the bottom and the top of the machine body.

6. Cutting machine according to claim 1, characterized in that the third bow handle portion, as viewed in a right hand side elevation of the machine, forms an obtuse angle with the first bow handle portion, so that said third portion extends rearwards relative to said first bow handle portion.

7. Cutting machine according to claim 6, wherein a fourth portion (25*e*) of the bow handle extends above the machine, connecting said third portion on the right hand side of the machine with a fifth portion (25*d*) on the left hand side of the machine, said fourth portion being located approximately above a rearmost part of the saw blade, when the first fixing member is in engagement with a foremost of said second fixing members and located to the rear of the axis of rotation of the handle bow and above the maneuvering arm (6) of which said rear maneuvering handle (20) forms a part, when the first fixing member is in engagement with a rearmost of said second fixing members.

8. Cutting machine according to claim 7, characterized in that at least a part of the handle bow is located in front of the axis of rotation (24) of the handle bow, when the handle bow takes its foremost rotational position.

9. Cutting machine according to claim 1, characterized in that said gripping handle (155) is a pull handle and said spring member is a pull back spring, wherein the gripping handle is provided to be pulled outwards relative to the cutting machine in a direction parallel to the axis of rotation of the bow handle for said retraction of the first fixing member under compression of said spring member.

10. Cutting machine according to claim 9, characterized in that the first fixing member includes a plunger (151) on a plunger rod, that said spring member is provided to press the plunger rod and the first fixing member against said second fixing members, and that said plunger and said spring member are accommodated in a second bow handle portion (25g) extending outwards from said first end of said first bow handle portion.

11. Cutting machine according to claim 1, characterized in that the first fixing member is a conical male member and that said second fixing members are female fixing members in the form of recesses in said stationary part of the machine, provided to accommodate the first fixing member in the different rotational positions of the handle bow.

12. Cutting machine according to claim 11, characterized in that at least a part of the handle bow is located in front of the axis of rotation (24) of the handle bow, when the handle bow takes its foremost rotational position.

13. Cutting machine according to claim 1, characterized in that the saw blade is an annular blade with off-center drive, where a pair of support rollers for the annular blade are arranged in a cover (5) for the pair of support rollers on one side of the blade, while the drive motor (2) and a pair of second rollers are arranged in or on a chassis (4) on the other side of the blade, which support roller cover and which chassis are included as parts of said machine body, that the handle bow is rotatably united with the chassis, and that said cover (5) defines said stationary part of the machine, on which said series of second fixing members are provided.

14. Cutting machine according to claim 1, characterized in that at least a part of the handle bow is located in front of the axis of rotation (24) of the handle bow, when the handle bow takes its foremost rotational position.

\* \* \* \* \*